United States Patent [19]

Wang

[11] Patent Number: 5,052,438

[45] Date of Patent: Oct. 1, 1991

[54] HOT/COLD WATER FLOW RATE REGULATING DEVICE

[76] Inventor: Hong-Shang Wang, No. 70, Lane 139, Lien Cheng Rd., Chung-Ho, Taipei Hsien, Taiwan

[21] Appl. No.: 600,987

[22] Filed: Oct. 23, 1990

[51] Int. Cl.⁵ .................................. F16K 11/16
[52] U.S. Cl. ............................. 137/607; 137/613
[58] Field of Search ................. 137/607, 613, 614

[56] References Cited

U.S. PATENT DOCUMENTS

| | | | |
|---|---|---|---|
| 2,644,662 | 7/1953 | Powers | 137/613 X |
| 2,712,830 | 7/1955 | Hugg | 137/613 |
| 2,934,091 | 4/1960 | Chapou | 137/607 X |
| 3,905,582 | 9/1975 | Fiorentini | 137/607 X |
| 4,784,180 | 11/1988 | Sieberhagen | 137/607 X |
| 4,957,137 | 9/1990 | Wang | 137/607 |

FOREIGN PATENT DOCUMENTS 821221  11/1937  France ............................. 137/607

Primary Examiner—Stephen M. Hepperle
Attorney, Agent, or Firm—Wenderoth, Lind & Ponack

[57] ABSTRACT

A hot/cold water flow rate regulating device, comprising a holder and a cap respectively secured to a mounting plate by a connecting rod and a bolt head stake. A tubular driving member which has a spiral track on its inside is fastened in the cap to drive a link to carry two valve rod assemblies to move up and down so as to respectively regulate the flow rate of hot and cold water and cold water into a mixing chamber for further discharge through a water outlet pipe.

9 Claims, 8 Drawing Sheets

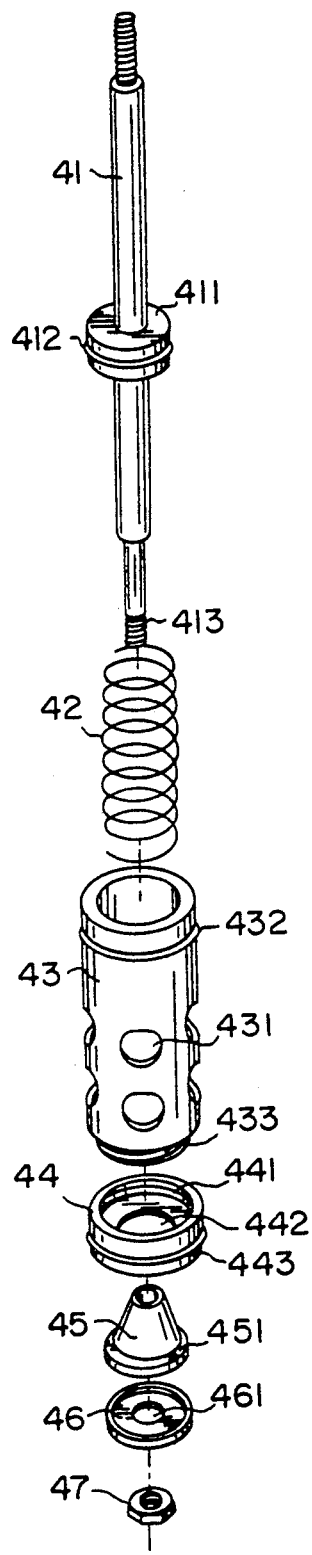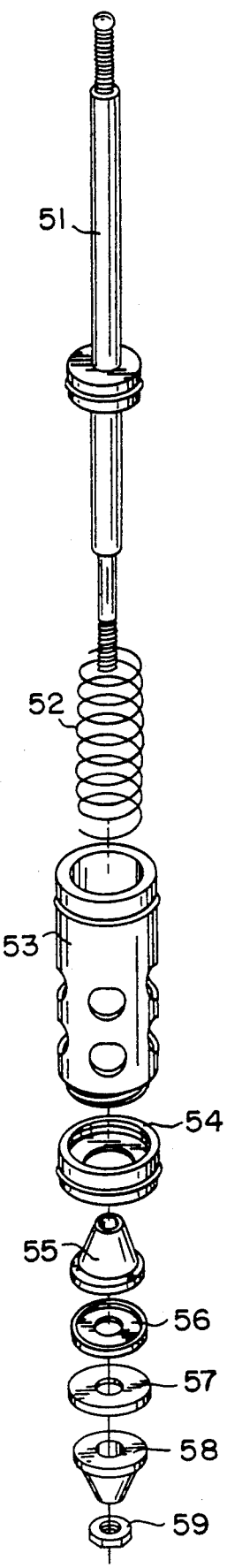
FIG.4A
FIG.4B

HOT/COLD WATER FLOW RATE REGULATING DEVICE

BACKGROUND OF THE INVENTION (a) Field of the Invention

The present invention relates to water flow rate regulating devices, and more particularly relates to a hot/cold water flow rate regulating device which comprises a holder and a cap respectively secured to a mounting plate by a connecting rod and a bolt head stake, which cap comprises a tubular driving member having a spiral track on its inside and rotated by the cap through 300° angle to further force a link to push two valve rod assemblies to move downward or permitting the two valve rod assemblies to be pushed upward by compression springs so as to respectively regulate the flow rate of hot and cold water and cold water into a mixing chamber for further discharge through a water outlet pipe.

(b) Description of the Prior Art

Regular hot/cold water flow rate regulating device generally comprises two separate control knobs respectively for controlling the flow rate of hot water and the flow rate of cold water. This structure is inconvenient in use. There is another type of water tap for regulating hot/cold water flow rate through the control of a handhold. In this structure, hot water and cold water are guided into the water chamber, and the water tap through a common water intake hole, and the temperature of mixed water is very difficult to control. When the pressure of cold water surpasses the pressure of hot water, abrupt changes of water temperature will happen. During operation, hot water pipe may be forced by the water pressure from cold water pipe to increase the pressure of the vapor therein, and the vapor will force cold water to flow backward. Therefore, cold water flow rate will be reduced. Once the pressure of the vapor inside hot water pipe is eliminated, cold water flow rate is relatively increased and water temperature of mixed water may become excessively low. In U.S. Pat. No. 2,653,628 there is disclosed a ball valve type of hot/cold water flow regulating device. This structure is still not satisfactory in use. It is easy to damage and can not eliminate water leakage problem. Because of its limited water mixing chamber, water temperature control is more difficult to achieve.

SUMMARY OF THE INVENTION

The present invention has been accomplished under the circumstances in view. It is an object of the present invention to provide a hot/cold water flow rate regulating device which has a spacious water mixing chamber for mixing hot and cold water taken in from two separate water intake holes so that stable water temperature can be well controlled.

It is another object of the present invention to provide a hot/cold water flow rate regulating device which comprises a tubular driving member having a spiral track therein and rotated to force a link to move two separate valve rod assemblies to change the position so as to properly regulate hot/cold water flow rate.

It is still another object of the present invention to provide a hot/cold water flow rate regulating device which provides a water stop control to effectively stop water supply without causing any water leakage problem, and the rubber water seals fastened therein are vertically squeezed to stop water leakage and eliminated from twisting force so that extended service life can be achieved.

It is still another object of the present invention to provide a hot/cold water flow rate regulating device which comprises two separate water intake pipe assemblies for taking in hot and cold water respectively, which water intake pipe assemblies can be respectively rotated through 360° angle for easy installation.

It is still a yet further object of the present invention to provide a hot/cold water flow rate regulating device which comprises two separate water intake pipe assemblies conveniently for connection to hot and cold water supply pipes without the use of any additional water leakage protection means.

BRIEF DESCRIPTION OF THE DRAWINGS

FIGS. 4a and 4b are exploded structural views of the valve rod assemblies thereof;

DETAILED DESCRIPTION OF THE PREFERRED EMBODIMENTS

Figure 1:
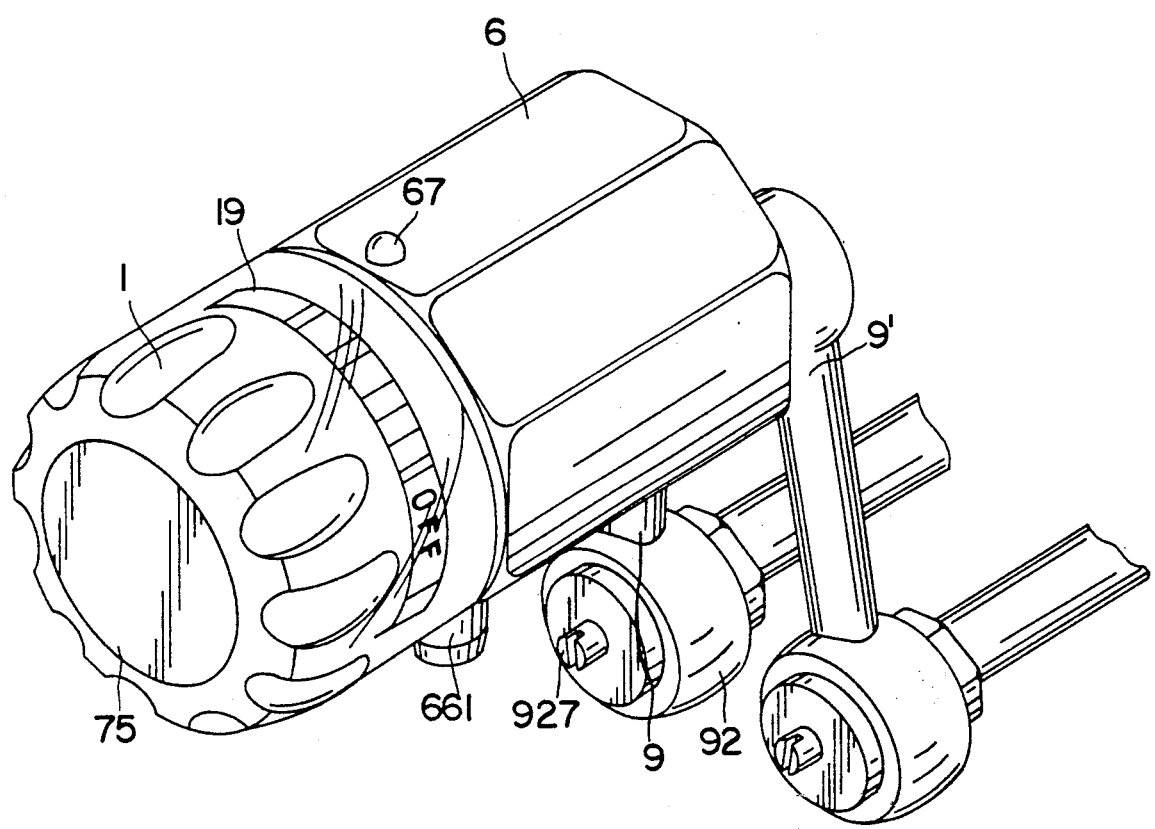
FIG. 1 is a perspective view of the preferred embodiment of the present invention.
Figure 2:
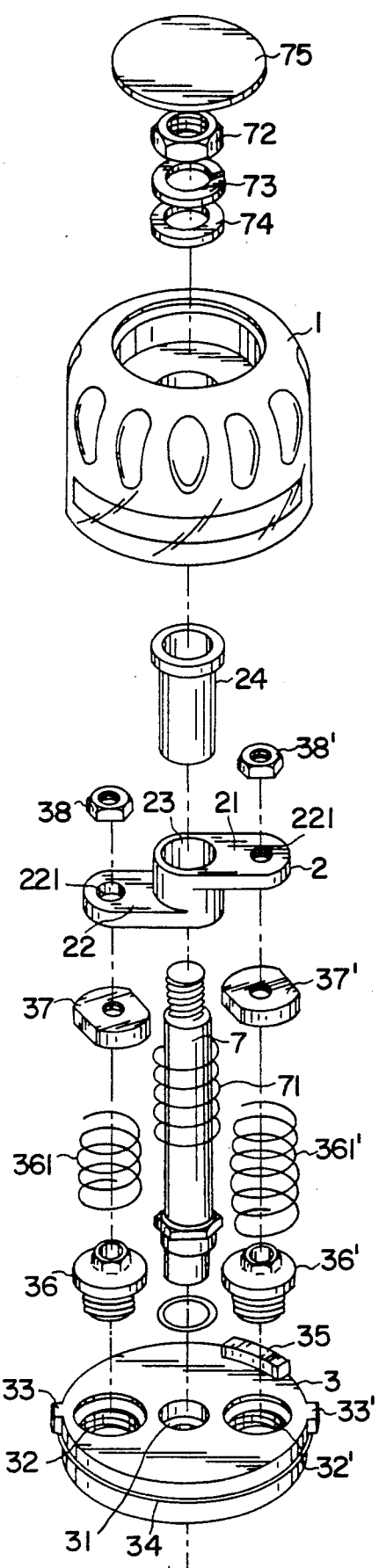
FIG. 2 is a perspective exploded view of the preferred embodiment of the present invention.
Figure 2:
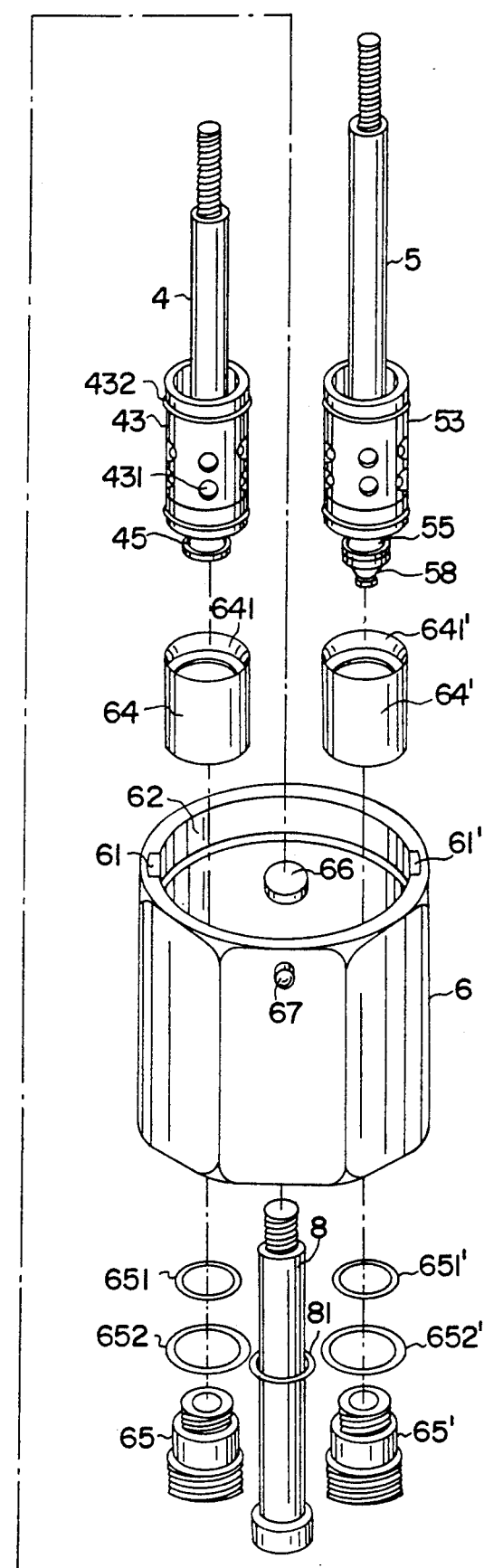

Referring to FIGS. 1 and 2, a hot/cold water flow rate regulating device according to the present invention is generally comprised of a cap 1, a Z-shaped link 2, a mounting plate 3, two valve rod assemblies 4 and 5, and a holder 6.

Figure 3:
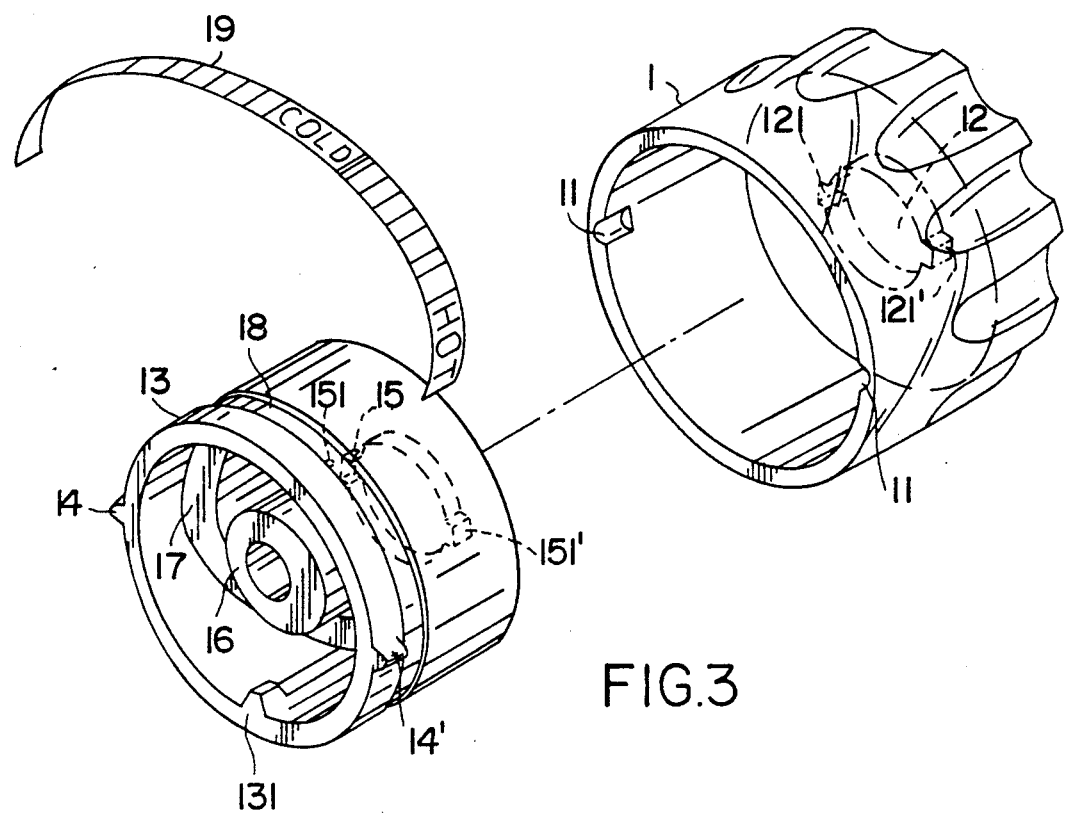
FIG. 3 is a perspective dismantled view of the cap and the tubular driving member thereof.

Referring to FIG. 3, the cap 1 is a hollow cylindrical casing for holding a tubular driving member 13, having one end opened and the opposite end closed. There are two opposite locking notches 11 and 11' internally made on the edge of the open end of the cap 1. A hole 12 is made on the closed end of the cap 1 at the center. There are also provided two relatively smaller notches 121 and 121' on the edge of the hole 12. The tubular driving member 13 has one end closed and the opposite end opened. A raised portion 15 which has two opposite projections 151 and 151' transversely extending outwards therefrom at two opposite ends is made on the closed end of the tubular driving member 13 and designed in shape and size corresponding to the hole 12 and the locking notches 121 and 121' of the cap 1 for convenient engagement. Two unitary keys 14 and 14' are externally made on the edge of the open end of the tubular driving member 13 for engagement with the two locking notches 11 and 11' of the cap 1. A hollow, cylindrical column 16 is made inside the opened end of the tubular driving member vertically extending upward from the closed end thereof at the center. A spiral guide track 17 is made inside the tubular driving member 13 spirally extending upward from the inside of the closed end along the inner wall surface thereof. A circular groove 18 is made on the tubular driving member 13 around its outer wall at a suitable location for fastening a temperature index 19. There is also provided an unitary locking key 131 on the inner wall of the tubular driving member 13 at the edge of its open end.

The Z-shaped link 2 comprises a center hole 23 vertically piercing therethrough at the center for fastening a rivet-shaped element 24, and two opposite extensions 21 and 22 disposed at different level position and respectively extending outwards therefrom in opposite directions. A bolt hole 211 and a through-hole 221 are respectively made on the two opposite extensions 21 and 22 of the Z-shaped strop member 2.

The mounting plate 3 is an element for coupling the cap 1 to the holder 6, having a stepped hole 31 at the center, two stepped, bolt holes 32 and 32' at two opposite sides by the stepped hole 31, two side projections 33 and 33' respectively extending from the side edge and disposed at the outer side by the stepped, bolt holes 32 and 32', an oil seal ring 34 mounted on its outer diameter, and a locking key 35 extending upward at the top.

There is provided a bolt head stake 7 having a spring 71 sleeved thereon and a seal ring 311 fastened in its stepped bottom end which is inserted in the stepped hole 31 at the center of the mounting plate 3. The bolt head of the stake 7 is respectively inserted in proper order through the center hole 23 of the Z-shaped link 2, the rivet-shaped element 24 and the hollow, cylindrical column 16 and fixedly secured to the cap 1 by a lock nut 72 with a C-ring 73 and a ring-shaped gasket 74 fastened therebetween. After the bolt head stake 7 is fastened in the cap 1 and locked up with the lock nut 72, a circular insert 75 is fastened in the cap 1 at the top to fit flush with the topmost edge of the cap 1. Two bolted fastening elements 36 and 36' are respectively fastened in the two stepped, bolt holes 32 and 32' of the mounting plate 3 for insertion therethrough of the two valve rod assemblies 4 and 5 to respectively fastened in the two extensions 21 and 22 of the Z-shaped link 2 with springs 361 and 361' and nuts 37 and 37' respectively retained therebetween.

Referring to FIGS. 4a and 4b, the two valve rod assemblies 4 and 5 have same structure in different size. The smaller valve rod assembly 4 is now taken as an example for description of the structure. The valve rod assembly 4 is generally comprised of an elongated rod 41 having two opposite ends properly threaded, a spring 42, a valve body 43, a base 44, a flexible conical insert 45 and a cap 46. The elongated rod 41 has a ring-shaped projection 411 at the middle with an oil seal ring 412 fastened on its outer diameter. The spring 42 is inserted inside the valve body 43. The valve body 43 has a plurality of through-holes 431 around its periphery, an oil seal ring 432 fastened on its outer diameter at an upper end, and an outer thread 433 on its bottom end. The base 44 is substantially shaped like a cap, having an inner thread 441 at one end, a center hole 442 through its closed end, and an oil seal ring 443 fastened on its outer diameter. The flexible conical insert 45 has a ring-shaped projection 451 at the bottom and partly fastened in the cap 46 which has a small hole 461 at the center. During assembly, the elongated rod 46 is inserted downward through the spring 42, the valve body 43, the base 44, the conical insert 45 and the cap 46 to lock up with a lock nut 47, permitting these component parts to be firmly retained between bottom thread 413 and the ring-shaped projection 411 of the elongated rod 41. Similar to the smaller valve rod assembly 4, the bigger valve rod assembly 5 is comprised of an elongated rod 51, a spring 52, a valve body 53, a base 54, a flexible conical insert 55 and a cap 56. Unlike the smaller valve rod assembly, the elongated rod 51 of the bigger valve rod assembly 5 is locked up with a lock nut 59 with a washer 57 and a flexible conical cushion 58 secured therebetween. The flexible conical cushion 58 is identical to the flexible conical insert 55 but disposed in an inverted position relative to the flexible conical insert 55.

Figure 5:
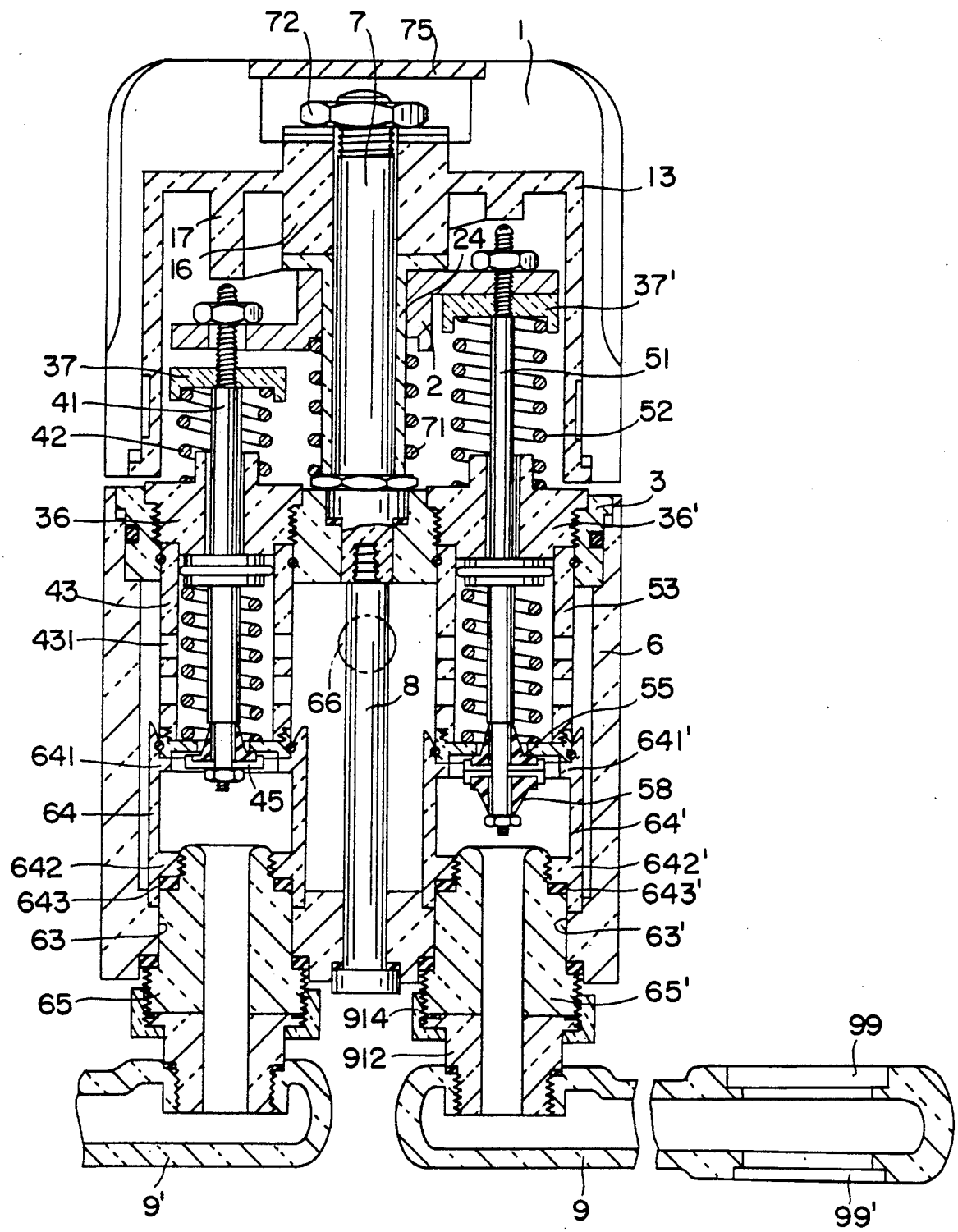
FIG. 5 is a longitudinal sectional view of the preferred embodiment of the present invention (under the condition when flow of water is completely stopped)

The holder 6 is a socket having a stepped inner wall defining therewith a circular recess 62 at the top for holding the mounting plate 3 with two locking notches 61 and 61' internally made on its topmost edge at two opposite locations, a closed bottom end with two through-holes 63 and 63' (see FIG. 5) made thereon respectively for mounting two tubular elements and 64', a through-hole 66 and a raised portion 67 transversely made on its outer wall at two opposite locations. As illustrated in FIG. 5, the two tubular elements 64 and 64' have each a tapered orifice 641 or 641' at the top, a ring-shaped projection 642 or 642' transversely extending inward from its inner wall at a lower end, and an inner thread 643 or 643' at the bottom end. Two stepped fastening elements 65 and 65' are respectively fastened in the two through-holes 63 and 63' on the closed bottom end of the holder 6 at the bottom and screwed up with the inner thread 643 or 643' of the tubular elements 64 and 64', with oil seal rings 651 and 652 or 651' and 652' respectively fastened thereon on the steps thereof. The through-hole 66 of the holder 6 is provided for mounting water outlet pipe 661 (see FIG. 1), and the raised portion 67 thereof is provided for indication of water temperature with the temperature index 19.

There is also provided a stepped hole 68 on the bottom closed end of the holder 6 at the center through which a connecting rod 8 which has an oil seal ring 81 mounted thereon is inserted from the bottom with its threaded top end fastened in the bolt hole on the bottom end of the bolt head stake 7 permitting the holder 6 to be movably connected to the cap 1.

Figure 6:
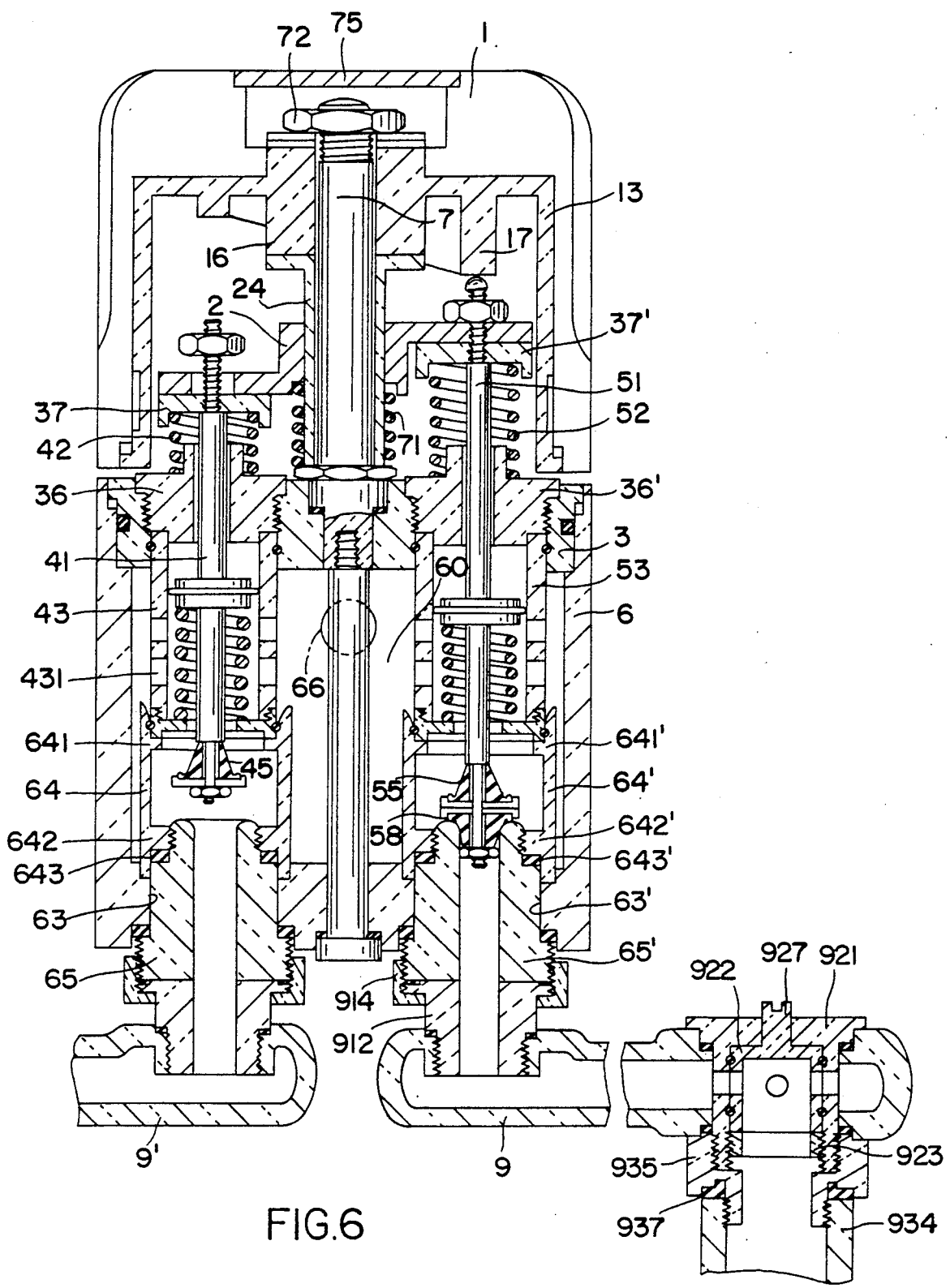
FIG. 6 is another longitudinal section view of the preferred embodiment of the present invention (under the condition when only hot water is supplied)

As indicated, the valve rod assemblies 4 and 5 are respectively inserted through the two extensions 21 and 22 of the Z-shaped link 2 from the bottom to lock up with a lock nut 38 or 38' each, wherein the elongated rod 51 of the bigger valve rod assembly 5 is firmly fastened in the bolt hole 211 through screw-joint and locked up with the lock nut 38'; the elongated rod 41 of the smaller valve rod assembly 4 is movably inserted through the through-hole 221 and locked up with the other lock nut 38. When water flow is completely stopped from flowing out of the device (see FIG. 5), the lowest point of the guide track 17 of the tubular driving member 13 is stopped against the top end of the elongated rod 51 of the bigger valve rod assembly 5. Once the cap 1 is rotated, the valve rod assembly 5 is moved downward along the guide track 17 to simultaneously carry the Z-shaped link 2 to move downward so as to drive the smaller valve rod assembly 4 to displace. At the same time, the flexible conical inserts 45 and 55 are moved to respectively control hot/cold water intake amount permitting hot/cold water to respectively flow through the valve bodies 43 and 53 into a mixing chamber 60 defined inside the holder 6 for further discharge from the through-hole 66 through the water outlet pipe 611. Therefore, water temperature and flow rate are simultaneously controlled by the flexible conical inserts 45 and 55, according to the downward moving rang of the valve rod assemblies 4 and 5. However, when the cap 1 is rotated to the limit (about 300° angle), the flexible conical cushion 58 is squeezed to completely seal the boring bore of the stepped fastening element 65' so that cold water is stopped from flowing into the valve rod assembly 5 which controls cold water flow rate. Under this condition, the valve rod assembly 4 which controls hot water flow rate is still opened for hot water to flow therethrough, i.e. only hot water is permitted to flow out of the water outlet pipe 611 (see FIG. 6).

Figure 7:
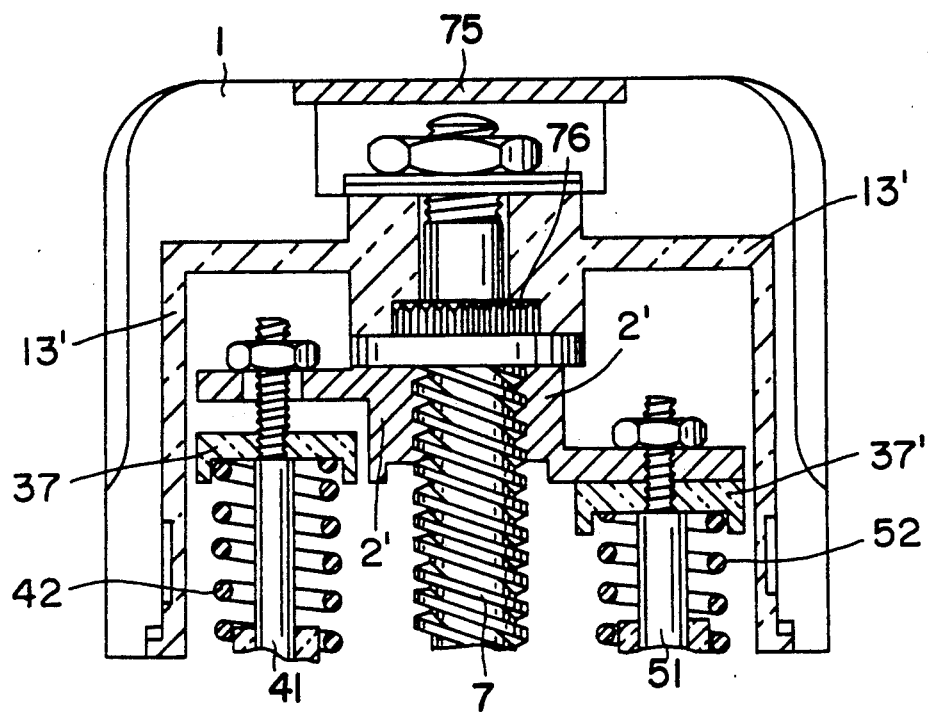
FIG. 7 illustrates an alternate form of the present invention.

In an alternate form of the present invention, the guide track 17 inside the tubular driving member 13 is omitted. As illustrated in FIG. 7, the stake 7' has a left-handed thread at the top and screwed up with the inner thread on the Z-shaped link 2. The tubular driving member 13' has a toothed, stepped hole for engagement with a toothed portion 76 on the outer diameter of the stepped portion of the stake 7' permitting the stake 7' to be rotated by the tubular driving member 13. Thus, the rotary motion of the cap 1 can directly control the downward displacement of the Z-shaped link 2'.

Figure 8:
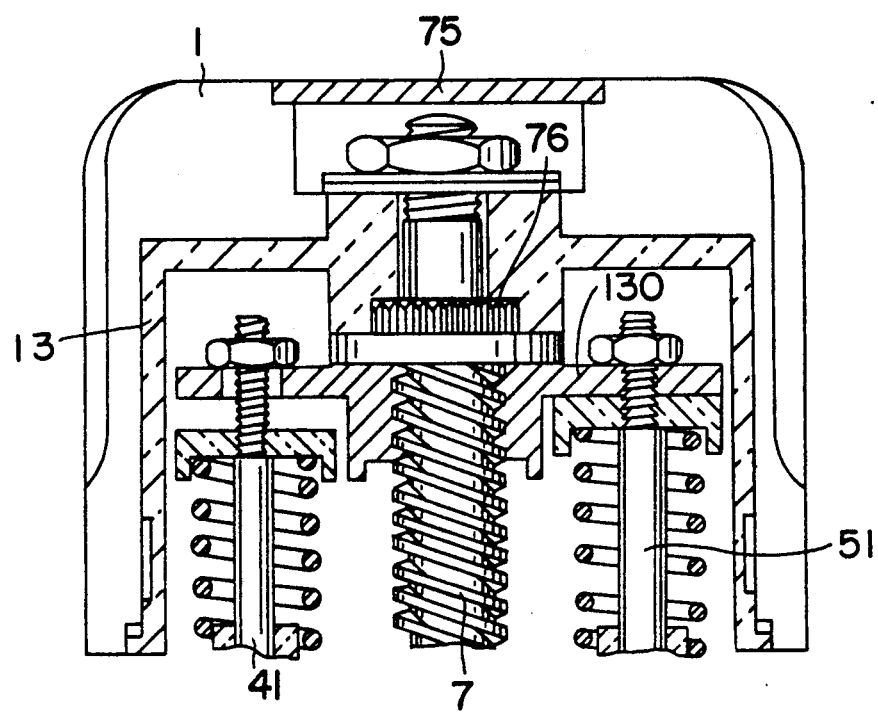
FIG. 8 illustrates another alternate form of the present invention.

Referring to FIG. 8, a T-shaped link 130 may be used to replace the Z-shaped link 2. Similar to the Z-shaped link 2, the two opposite extensions of the T-shaped link 130 have a bolt hole and a through-hole made thereon respectively for mounting the two valve rod assemblies 4 and 5. When the cap 1 is rotated, the valve rod assembly 5 for controlling cold water flow rate is firstly squeezed downward to further force the T-shaped link 130 to drive the valve rod assembly 4 for controlling hot water flow rate.

Figure 10:
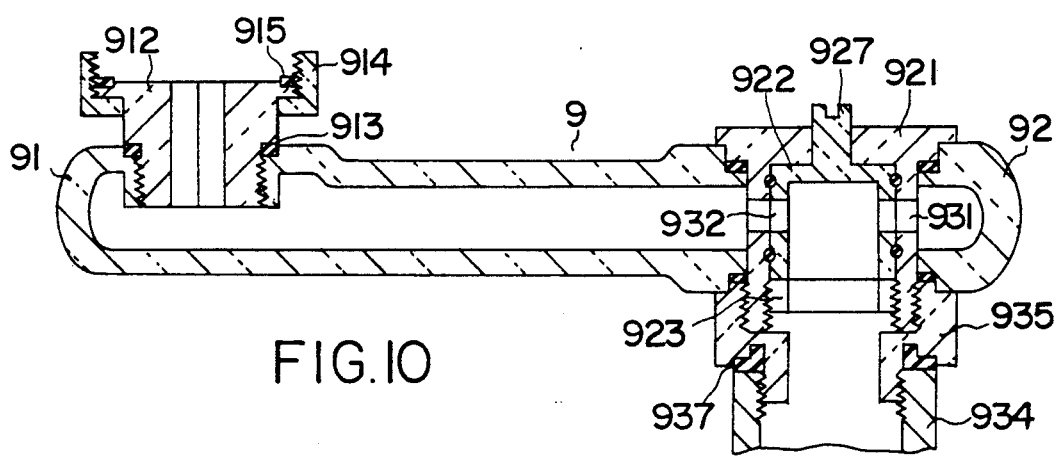
FIG. 10 is a sectional assembly view of the water intake pipe assembly of FIG. 9.
Figure 9:
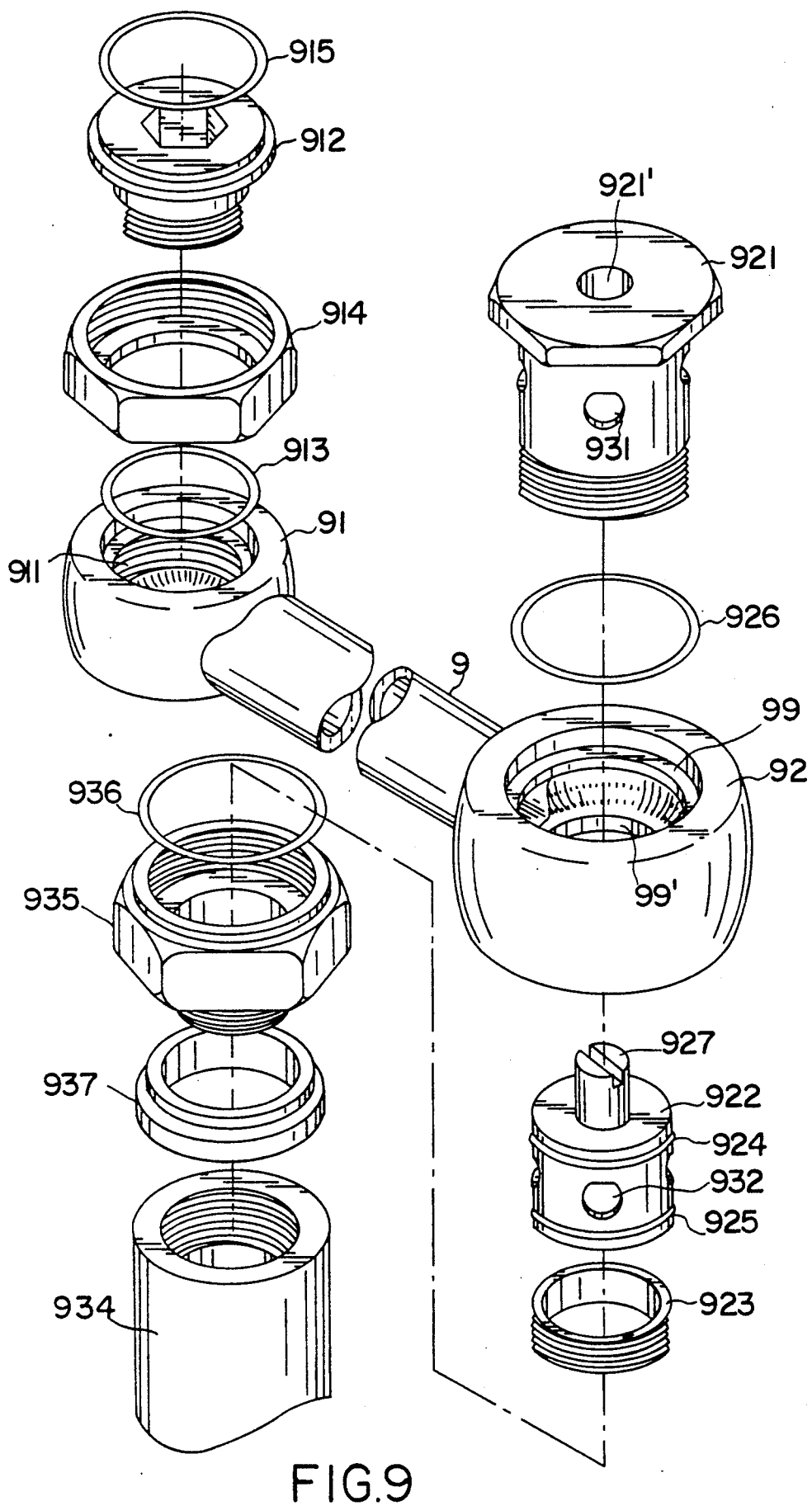
FIG. 9 is a structural dismantled view of a water intake pipe assembly according to the present invention.

Referring to FIG. 9, hot and cold water intake pipe assemblies 9 and 9' are connected to the holder 6 for supplying hot/cold water. These two water intake pipe assemblies 9 and 9' are identical in structure and the structure of which is outlined hereinafter with reference to FIGS. 9 and 10. The water intake pipe assembly 9 is now described as an example for understanding of the structure. As illustrated, the water intake pipe assembly 9 is an elongated hollow tube having an unitary socket 91 or 92 each transversely disposed at its two opposite ends and respectively in communication with its boring bore. The socket 91 which is disposed at the front end has a single opening defining therein a stepped blind hole with an inner thread 911 made on its inner wall. After an oil seal ring 913 is inserted inside the stepped blind hole of the socket 91, a nut 914 is placed on the top of the socket 911 and then, a bolted, stepped fastening element 912 is inserted through the nut and screwed up with the inner thread 911 of the socket with an oil seal ring 915 squeezed in between the nut 914 permitting the nut 914 to firmly screw up with the stepped fastening element 65' of the holder 6. The socket 92 at the rear end of the water intake pipe assembly 9 defines therein a stepped through-hole, i.e. a wider upper through-hole 99 and a narrower lower through-hole 99'. There is provided a hollow bolt 921, which has a plurality of water outlets 931 around its outer wall, inserted downward in the stepped hole of the rear socket 92 with an oil seal ring 926 squeezed in therebetween. A hollow, cylindrical switch control member 922 which has a plurality of through-holes around 932 its outer wall with two oil seal rings 924 and 925 respectively fastened on its outer wall at two opposite ends is inserted in the hollow bolt 921 with its slotted, top projection 927 fastened in the center hole 921' of the hollow bolt 921. After the switch control member 922 is inserted through the socket 92 into the hollow bolt 921, an outer-threaded ring 923 is fastened inside the hollow bolt 921 through screw joint to firmly secure the switch control member 922 in the hollow bolt 921. By means of rotating the switch control member 922, water flow rate is properly regulated.

Figure 11:
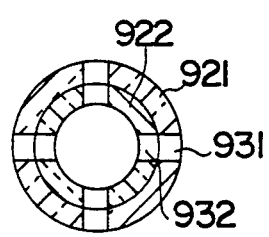
FIG. 11 is a schematic drawing illustrating the engagement of a switch control member with a hollow bolt when flow of water is permitted to flow therethrough.
Figure 12:
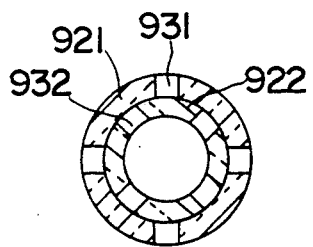
FIG. 12 is a schematic drawing illustrating the engagement of a switch control member with a hollow bolt when flow of water is stopped from flowing therethrough.

Referring to FIG. 11, a screw driver can be used to drive the slotted top projection 927 of the switch control member 922 to rotated so as to move its through-holes 932 to respectively align with the water outlets 931 of the hollow bolt 921 permitting water to flow into the water intake pipe assembly 9. When the through-holes 932 are moved away from the water outlets 931, as illustrated in FIG. 12, water is stopped from flowing into the water intake pipe assembly 9.

Referring to FIG. 9 again, the rear end of the hollow bolt 921 is fastened up with a lock nut 935 with an oil seal ring 936 squeezed in therebetween, which lock nut 935 has an outer-threaded projecting end mounted with a gasket 937 and fastened in a water conduit 934 through which water supply is provided. Because the hollow bolt is inserted through the rear socket 92 of the water intake pipe assembly 9 at one end, to screw up with the lock nut 935 at an opposite end, the water intake pipe assembly 9 is permitted to rotate through 360° angle so as to best fit the mounting condition.

What is claimed:

1. A hot/cold water flow rate regulating device, comprising:

a cap, being a hollow cylindrical casing for holding a tubular driving member, having an end opened and an opposite end closed, two opposite locking notches internally made on the edge of its open end, a center hole made on its closed end at the center, two relatively smaller notches made on the edge of said center hole, said tubular driving member having a closed end with raised portion made thereon and designed in size and shape corresponding to said center hole, and an opened end with two unitary keys externally made on its edge for engagement with the two locking notches of said cap, a hollow, cylindrical column made inside the opened end of said tubular driving member at the center, a spiral guide track made inside said tubular driving member spirally extending upward from its inner wall surface, and an unitary locking key made on the inner wall of said tubular driving member at the edge of its open end;

a Z-shaped link comprising a center hole vertically piercing therethrough at the center for fastening a rivet-shaped element, and two opposite extensions disposed at different level position and respectively extending outwards therefrom in opposite directions, said two opposite extensions having a bolt hole and a through-hole alternatively made thereon;

a mounting plate for coupling said cap to said holder, having a stepped hole at the center, two stepped, bolt holes on the top at two opposite locations, two side projections transversely extending outward therefrom at two opposite sides, an oil seal ring mounted on its outer diameter, and a locking key extending upward therefrom at the top;

two valve rod assemblies of same structure in different size, each comprising an elongated rod having two opposite ends properly threaded, a spring, a valve body, a base, a flexible conical insert and a bottom cap, said elongated rod having a ring-shaped projection at the middle with an oil seal ring fastened on its outer diameter, said spring being inserted inside said valve body, said valve body having a plurality of through-holes around its periphery, an oil seal ring fastened on its outer diameter at an upper end and an outer thread made on its bottom end, said base having an inner thread at one end, a center hole through its closed bottom end and an oil seal ring fastened on its outer diameter, said flexible conical insert having a ring-shaped projection at the bottom and partly fastened in said bottom cap, said bottom cap having a small hole at the center, the elongated rod of the smaller valve rod assembly being inserted downward through a spring, a valve body, a base, a conical insert and a bottom cap to lock up with a lock nut, the elongated rod of the bigger valve rod assembly being inserted downward through a spring, a valve body, a base, a conical insert and a bottom cap to further lock up with a lock nut with a washer and an inverted, flexible, conical cushion secured therebetween;

a socket-like holder having a stepped inner wall defining therewith a circular recess at the top with two locking notches internally made on its topmost edge at two opposite locations for holding said mounting plate; a closed bottom end with a stepped hole made at the center and two through-holes made at two opposite locations for mounting two tubular elements respectively for holding said two valve rod assemblies, said tubular elements having each a tapered orifice at the top, a ring-shaped projection transversely extending inward from its inner wall at a lower end and a inner thread at the bottom end; an opening on its outer wall for mounting a water outlet pipe; two stepped fastening elements respectively fastened in the two through-holes on its closed bottom end and screwed up with the inner thread of said tubular elements with two oil seal rings each respectively fastened on the outer wall at two opposite ends;

a bolt head stake having a stepped bottom end sleeved with a spring and fastened with an oil seal ring and inserted in the stepped hole at the center of said mounting plate, and a bolt head respectively inserted through the center hole of said Z-shaped link, said rivet-shaped element and the hollow cylindrical column of said cap and fixedly secured thereto by fastening means;

two bolted fastening elements respectively fastened in the two stepped, bolt holes of said mounting plate for insertion therethrough of said two valve rod assemblies to respectively fastened in the two extensions of said Z-shaped link with springs and nuts respectively retained therebetween;

a connecting rod inserted through said holder from the bottom and having a threaded top end fastened in the bolt hole on the bottom end of said bolt head stake permitting said holder to be movably connected to said cap; and wherein said two valve rod assemblies are respectively inserted through the two extensions of said Z-shaped link from the bottom to lock up with a lock nut each permitting the elongated rod of the bigger valve rod assembly to be fixedly fastened in the bolt hole on one of the extensions of said Z-shaped link, and permitting the elongated rod of the smaller valve rod assembly to be movably inserted through the through-hole on the other extension of said Z-shaped link.

2. The hot/cold water flow rate regulating device of claim 1, wherein two intake pipe assemblies are respectively connected to said holder for supplying hot/cold water, each of which comprises an elongated hollow tube having an unitary socket each transversely disposed at its two opposite ends and respectively in communication with its boring bore, the socket at one end having a single opening defining therein a stepped blind hole with an inner thread made on its inner wall for mounting a bolted, stepped fastening element with a nut and an oil seal ring squeezed in therebetween permitting the nut to firmly screw up with the corresponding stepped fastening element of said holder; the socket at the other end defines therein a stepped through-hole, having a hollow socket inserted therein at the top for connection with an outer-threaded ring to secure a switch control member inside said hollow bolt, permitting said switch control member to be rotated relative to said hollow bolt so as to regulate the flow rate of water passing therethrough.

3. The hot/cold water flow rate regulating device of claim 2, wherein the rear end of said hollow bolt is fastened up with a lock nut with an oil seal ring squeezed in therebetween, which lock nut has an outer-threaded projecting end mounted with a gasket and fastened in a water conduit through which water supply is provided.

4. The hot/cold water flow rate regulating device of claims 2 and 3, wherein said hollow bolt is inserted through the rear socket of the corresponding water intake pipe assembly to screw up with a lock nut permitting the corresponding water intake pipe to rotate through 360° angle so as to best fit the mounting condition.

5. The hot/cold water flow rate regulating device of claim 1, wherein said valve body has a plurality of through-holes around its periphery, an oil seal ring fastened on its outer diameter at an upper end and an outer thread made on its bottom end; said base has an inner thread at one end, a center hole through its closed bottom end and an oil seal ring fastened on its outer diameter; said flexible conical insert has a ring-shaped projection at the bottom and partly fastened in said bottom cap, said bottom cap having a small hole at the center with an inverted, flexible, conical cushion secured thereto at the bottom.

6. The hot/cold water flow rate regulating device of claim 1, wherein said tubular driving member of said cap has a circular groove around its periphery for fastening a temperature index; said holder has a raised portion on its outer wall and moved to rotate relative to said tubular driving member for temperature indication 7. The hot/cold water flow rate regulating device of claim 1, wherein the lowest point of said guide track of said tubular driving member is stopped against the top end of the elongated rod of the bigger valve rod assembly to completely stop water from flowing out of the device.

8. The hot/cold water flow rate regulating device of claim 1, wherein the guide track inside said tubular driving member is omitted; said stake has a left-handed thread at the top and screwed up with the inner thread on said Z-shaped link; said tubular driving member has a toothed, stepped hole for engagement with a toothed portion on the outer diameter of the stepped portion of said stake permitting said stake to be rotated by said tubular driving member so that the rotary motion of said cap can directly control the downward displacement of said Z-shaped link.

9. The hot/cold water flow rate regulating device of claim 1, wherein a T-shaped link is used to replace said Z-shaped link, said T-shaped link having two opposite extensions with a bolt hole and a through-hole alternatively made thereon for mounting said two valve rod assemblies.

* * * * *